United States Patent
Hellerstein et al.

(10) Patent No.: US 7,496,564 B2
(45) Date of Patent: Feb. 24, 2009

(54) RESOURCE OPTIMIZATIONS IN COMPUTING UTILITIES

(75) Inventors: Joseph L. Hellerstein, Ossining, NY (US); Kaan Katircioglu, Yorktown Heights, NY (US); Maheswaran Surendra, Croton-on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/993,269

(22) Filed: Nov. 19, 2004

(65) Prior Publication Data
US 2006/0112075 A1 May 25, 2006

(51) Int. Cl.
*G06F 17/30* (2006.01)
(52) U.S. Cl. .............................. 707/3; 707/5; 707/100; 707/102
(58) Field of Classification Search .................. 707/102
See application file for complete search history.

(56) References Cited

U.S. PATENT DOCUMENTS

| 5,164,988 | A | 11/1992 | Matyas et al. |
| 5,495,412 | A | 2/1996 | Thiessen |
| 6,459,944 | B1 | 10/2002 | Maturana et al. |
| 6,606,744 | B1 * | 8/2003 | Mikurak ..................... 717/174 |
| 6,728,706 | B2 * | 4/2004 | Aggarwal et al. ............. 707/5 |
| 6,857,020 | B1 * | 2/2005 | Chaar et al. ................. 709/226 |
| 6,877,035 | B2 * | 4/2005 | Shahabuddin et al. ....... 709/226 |
| 7,257,561 | B1 * | 8/2007 | Abe ........................... 705/400 |
| 2002/0059274 | A1 * | 5/2002 | Hartsell et al. .............. 707/100 |
| 2002/0194251 | A1 * | 12/2002 | Richter et al. ............... 709/105 |
| 2002/0198995 | A1 * | 12/2002 | Liu et al. .................... 709/226 |
| 2003/0004848 | A1 * | 1/2003 | Hellerstein et al. ........... 705/36 |
| 2003/0115106 | A1 * | 6/2003 | Crayton et al. ................ 705/26 |
| 2003/0217125 | A1 * | 11/2003 | Brancati et al. ............. 709/220 |
| 2004/0068431 | A1 * | 4/2004 | Smith et al. .................. 705/10 |
| 2004/0257985 | A1 * | 12/2004 | Sahai et al. ................. 370/229 |
| 2005/0222885 | A1 * | 10/2005 | Chen et al. ..................... 705/8 |

OTHER PUBLICATIONS

I. T. Eilam et al., "Using a Utility Computing Network to Develop Utility Systems," IBM Systems Journal, vol. 43, No. 1, pp. 97-120, 2004.
J. Rolia et al., "Automating Enterprise Application Placement in Resource Utilities," Distributed Systems Operations and Management, 12 pages, 2003.

* cited by examiner

*Primary Examiner*—Christian P. Chace
*Assistant Examiner*—Bai D Vu
(74) *Attorney, Agent, or Firm*—Ryan, Mason & Lewis, LLP (57) ABSTRACT

Techniques are provided for use in accordance with relates to computing utilities. For example, in one aspect of the invention, a method for use in a computing utility, wherein the computing utility comprises a plurality of application service provider systems and a utility controller, and each application service provider system comprising an application controller, comprises the following steps. An application request to one of the plurality of application service provider systems is obtained. Then, in response to the application request, at least one of: (i) the application controller of the application service provider system to which the application request is directed computes a value of a business metric associated with a resource action; and (ii) the utility controller computes a value of a business metric associated with a resource action.

12 Claims, 11 Drawing Sheets

RESOURCE OPTIMIZATIONS IN COMPUTING UTILITIES

FIELD OF THE INVENTION

The present invention relates generally to the global Internet network and, more particularly, to Internet servers of World Wide Web (WWW or Web) sites supporting one or more organizations hosted at these sites, and specifically providing service level agreements for each of these organizations in a manner that optimizes business metrics such as costs, revenues, and profits.

BACKGROUND OF THE INVENTION

As is known, Application Service Providers (ASPs) are hosted at a third party infrastructure (hereafter, the Computing Utility) that provides capabilities such as servers, network connectivity and storage. The Internet is the world's largest network, and it has become essential in organizations such as government, academia and commercial enterprises. Transactions over the Internet are becoming more common, especially in the commercial arena. Commercial entities increasingly operate as ASPs by running their customer-facing applications (e.g., product catalogues) on Computing Utilities.

ASPs often have agreements with their customers that specify service level objectives in terms of metrics such as response times, throughputs, and availability. These agreements are detailed in ASP Service Level Agreements (SLAs). SLAs may specify penalties if the service level objective is not met. We refer to the penalties incurred by an ASP as "SLA costs".

ASPs use the resources of the Computing Utility to deliver services, and the Computing Utility receives revenue for resources consumed by the ASP. This revenue may be calculated in many ways, such as fixed prices for a resource type, prices that are adjusted dynamically in response to loads, and prices that are negotiated between the ASP and the Computing Utility. Thus, there may be "Computing Utility SLAs" that specify how resource prices are computed and the penalties to be paid by the Computing Utility to ASPs if contracted resources are unavailable or are reclaimed before the ASP releases the resource.

As businesses, ASPs and Computing Utilities may utilize business metrics such as costs, revenues, and profits. While other business metrics may be used by ASPs, we illustratively refer to cost. Thus, a key challenge to the ASP is to determine the timing of resource requests and releases so as to minimize ASP total cost. ASP total cost is the sum of the SLA penalties and the cost of the resources used. We use the term "ASP resource action" to refer to ASP resource requests and releases.

There is a corresponding challenge for Computing Utilities in that they must determine which ASP resources should be allocated and when the resources should be reclaimed. We refer to these as "Computing Utility resource actions." While other business metrics may be used by Computing Utilities, we illustratively refer to profits.

Achieving these business-oriented optimizations requires an ability to calculate business metrics (e.g., cost, revenue, and profit) associated with resource actions. Thus, there is a need for systems and methods for performing the appropriate business metric calculations for ASPs and Computing Utilities and then searching for an allocation that optimizes the business metric.

The general concept of optimization is well known. Much work has been done with applying optimization to practical problems (e.g., U.S. Pat. No. 6,459,944 to Maturana, entitled "Self-optimizing Industrial Control System Using a Specific Process to Evaluate Bids"), although not to the structure of business-oriented cost functions used in Computing Utilities. Work in the area of negotiation has also been performed (e.g., U.S. Pat. No. 5,495,412 to Thiessen, entitled "Computer-based Method and Apparatus for Interactive Computer-assisted Negotiation") and policies (e.g., U.S. Pat. No. 5,164,988 to Metyas et al., entitled "Method to Establish and Enforce a Network Cryptography Security Policy"). Work specifically in the area of computing utilities (e.g., "Using a Utility Computing Framework to Develop Utility Systems," T. Eilam, IBM Systems Journal, March, 2004 and J. Rolia et al., "Automating Enterprise Application Placement in Resource Utilities," Distributed Systems Operations and Management, 2003) do not address how to optimize business metrics.

SUMMARY OF THE INVENTION

The present invention provides improved techniques for use in accordance with computing utilities.

For example, in one aspect of the invention, a technique for use in a computing utility, wherein the computing utility comprises a plurality of application service provider systems and a utility controller, and each application service provider system comprising an application controller, comprises the following steps/operations. An application request to one of the plurality of application service provider systems is obtained. Then, in response to the application request, at least one of: (i) the application controller of the application service provider system to which the application request is directed computes a value of a business metric associated with a resource action; and (ii) the utility controller computes a value of a business metric associated with a resource action.

The step/operation of the application controller computing a value of a business metric may further comprise one or more of: computing a service level agreement cost from one or more service level agreement parameters; computing a resource cost from one or more resource parameters; computing an aggregate service level agreement cost from different service level agreements; computing an aggregate resource cost from different resources; and computing a total cost from an aggregate service level agreement cost and an aggregate resource cost.

The step/operation of the utility controller computing a value of a business metric may further comprise one or more of: computing a resource cost from one or more resource parameters; computing an application service provider revenue; computing an aggregated revenue from individual application service provider revenues; computing an aggregated resource cost from different resources; and computing a profit from aggregated application service provider revenues and aggregated resource costs.

Further, the technique may further comprise the step/operation of the application controller requesting a number of resources of a specific type from the utility controller. Still further, the utility controller may notify the application controller that previously allocated resources must be returned. The application controller may notify the utility controller that resources are returned. The utility controller may notify the application controller that new resources are available.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention relates to environments in which there are one or more computing utilities, each with multiple ASP, and a single Utility Controller. Each ASP contains an Application Execution System that provides the environment and applications to deliver end-user services. The ASP also has an Application Controller that interacts with the Application Execution System and the Utility Controller to select and initiate ASP resource actions. The Utility Controller interacts with the Application Controller and other computing utilities to select and initiate Utility Controller resource actions.

It is to be appreciated that the term "ASP," as illustratively used in this detailed description, may also refer to the system that implements the Application Execution System and Application Controller. It will be evident when the term "ASP" is referring to such a system or when it is referring to the business entity associated with the system.

It is to be further appreciated that while the following illustrative description will refer to certain business metrics, such as cost and profits, the invention is not limited to any particular metric.

The present invention focuses on the Application Controller and the Utility Controller. The Application Controller (AC) comprises two components: AC Logic and AC Cost Function. AC Cost Function computes the cost function for the ASP. AC Logic searches the set of possible resource actions to determine the best one based on the costs provided by AC Cost Function. AC Cost Function provides at least one of the following capabilities:

1. computing SLA costs from SLA parameters;
2. computing resource costs from resource parameters;
3. computing aggregated SLA costs for different SLAs;
4. computing aggregated resource costs for different resource types;
5. computing total costs from aggregated SLA costs and aggregated resource costs.

The Utility Controller (UC) also comprises two components: UC Logic and UC Profit Function. These components operate in an analogous way to the corresponding Application Controller components.

As will be evident, although not limited thereto, methodologies of the invention provide the following exemplary capabilities:

1. allow a Computing Utility to assess the impact of a change in resource allocation;
2. specify how an ASP should respond to a change in resource configurations (e.g., the Computing Utility has added or removed a resource);
3. determine how the Utility Controller responds to an ASP resource action; and
4. detail how a Utility Controller responds to requests from other Computing Utilities.

The present invention provides ASPs and Computing Utilities with techniques for optimizing their business metrics. Clearly, this can increase the profitability of businesses employing these functions. A further advantage is that by having a separate cost function, there may be greater flexibility in deploying new pricing schemes, a capability that can offer a considerable competitive advantage.

Figure 1:
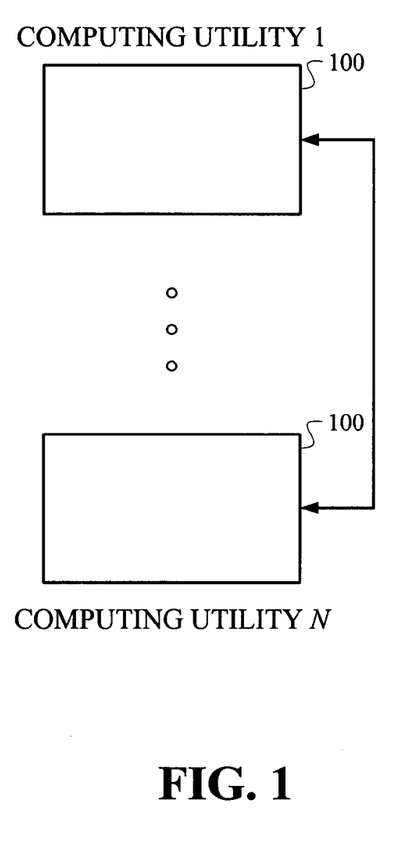
FIG. 1 illustrates a general environment in which techniques of the invention may be employed, according to an embodiment of the invention.

FIG. 1 illustrates a general environment in which techniques of the invention may be employed, according to an embodiment of the invention. As shown, the illustrative environment comprises one or more Computing Utilities 100. Computing Utilities communicate with one another to exchange information about available resources.

Figure 2:
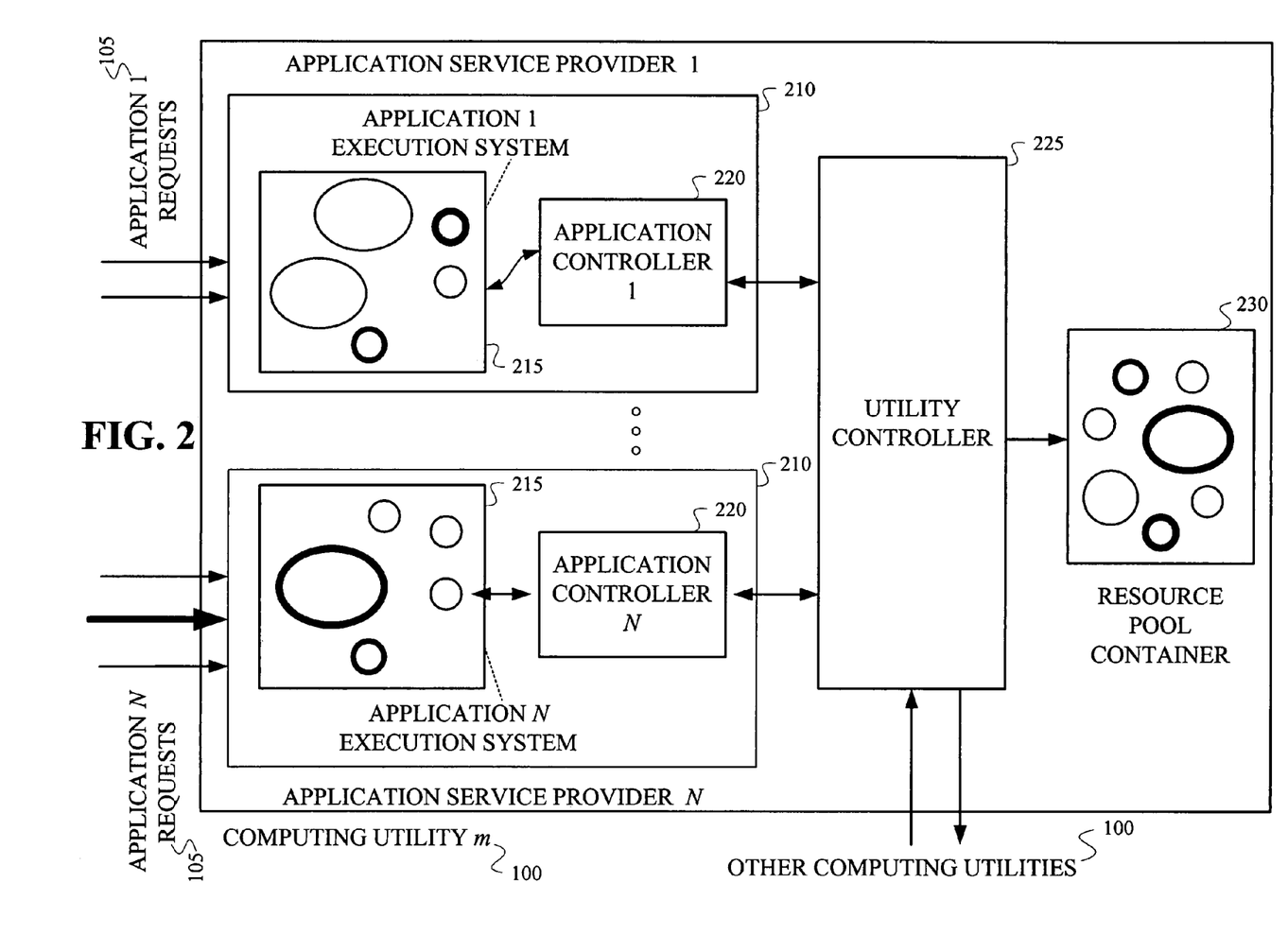
FIG. 2 illustrates a structure of a computing utility, according to an embodiment of the invention.

FIG. 2 illustrates a structure of a Computing Utility, according to an embodiment of the invention. As shown, the Computing Utility 100 comprises one or more Application Service Providers 210, a Utility Controller 225, and a Resource Pool Container 230. Application requests 105 are directed to one of the Application Service Providers where they are processed in accordance with SLAs.

An Application Service Provider 210 has an Application Execution System 215 in which requests are processed. The Application Execution System 215 interacts with the Application Controller 220 to specify performance with respect to service level objectives specified in ASP SLAs.

The Application Controller 220 specifies and initiates ASP resource actions that minimize total costs for the Application Controller 220. The Utility Controller 225 interacts with the Application Controller 220 and other Computing Utilities to specify Utility Controller resource actions that maximize the profits of the Computing Utility 100, and interacts with the Resource Pool Container 230 and other Computing Utilities to initiate resource actions.

It is to be appreciated that the solid circles illustrated in FIG. 2 represent resources (e.g., hardware and software resources) supplied by the Computing Utility. The resources may have different characteristics which are indicated by the different sized circles. Such resource characteristics may be: (i) dollars charged per seconds of usage; (ii) speed of processing; (iii) failure rate; (iv) repair rate, to name a few.

Figure 3:
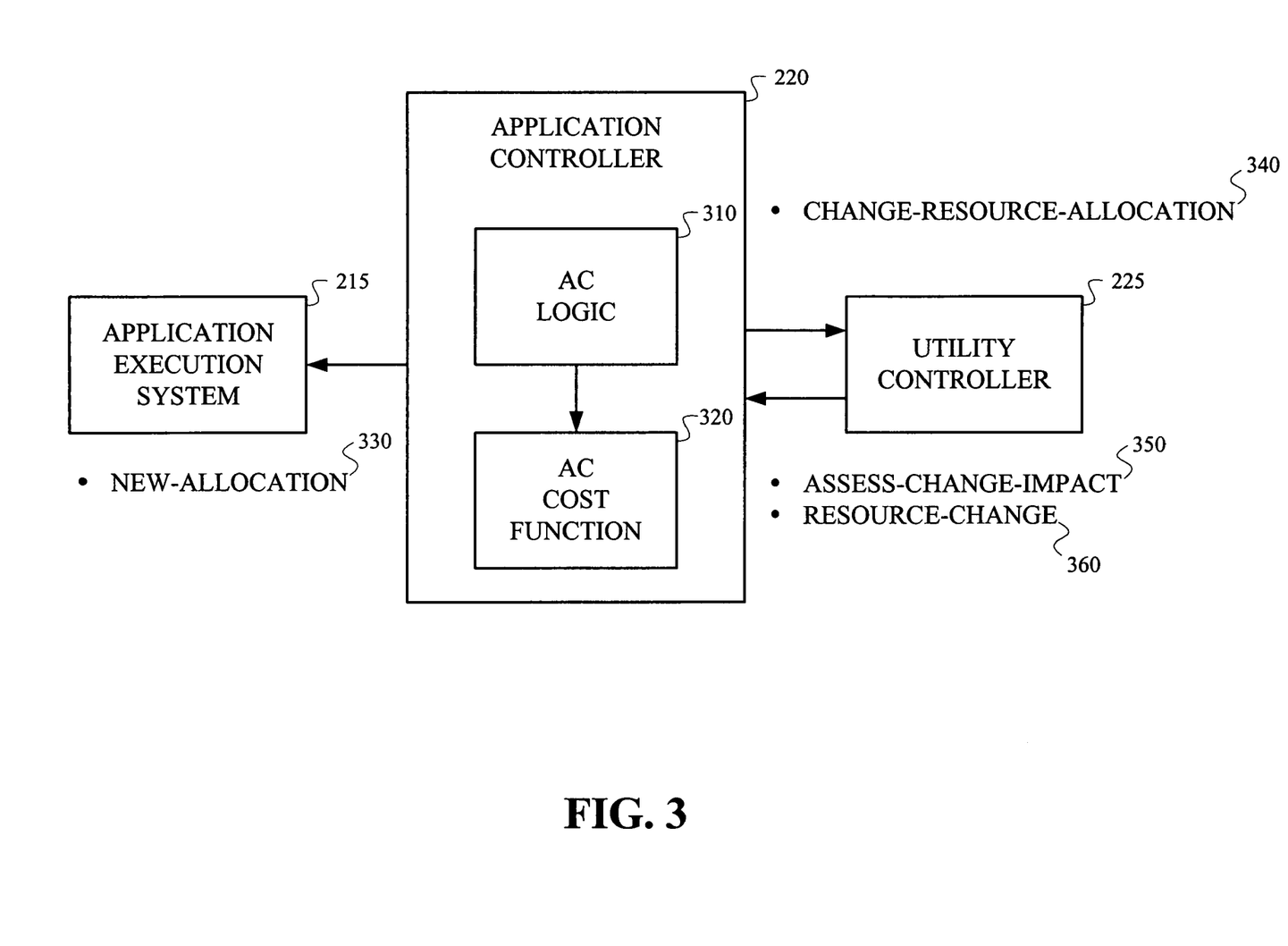
FIG. 3 illustrates an application controller system, according to an embodiment of the invention.

FIG. 3 illustrates an Application Controller system, according to an embodiment of the invention. Application Controller (AC) 220 comprises an AC Logic system 310 and an AC Cost Function 320. The Application Controller 220 sends a new-allocation message 330 to the Application Execution System 215 when the available resources have changed, and it sends a change-resource-allocation message 340 to the Utility Controller 225 when requesting or releasing resources. The Application Controller 220 receives from the Utility Controller 225 an assess-change-impact message 350 when the Utility Controller 225 is evaluating the effects of a change in resource allocation. The Application Controller 220 receives a resource-change message 360 when the Utility Controller 225 notifies it of a change in resources allocated to the ASP by the Computing Utility 100.

Figure 4:
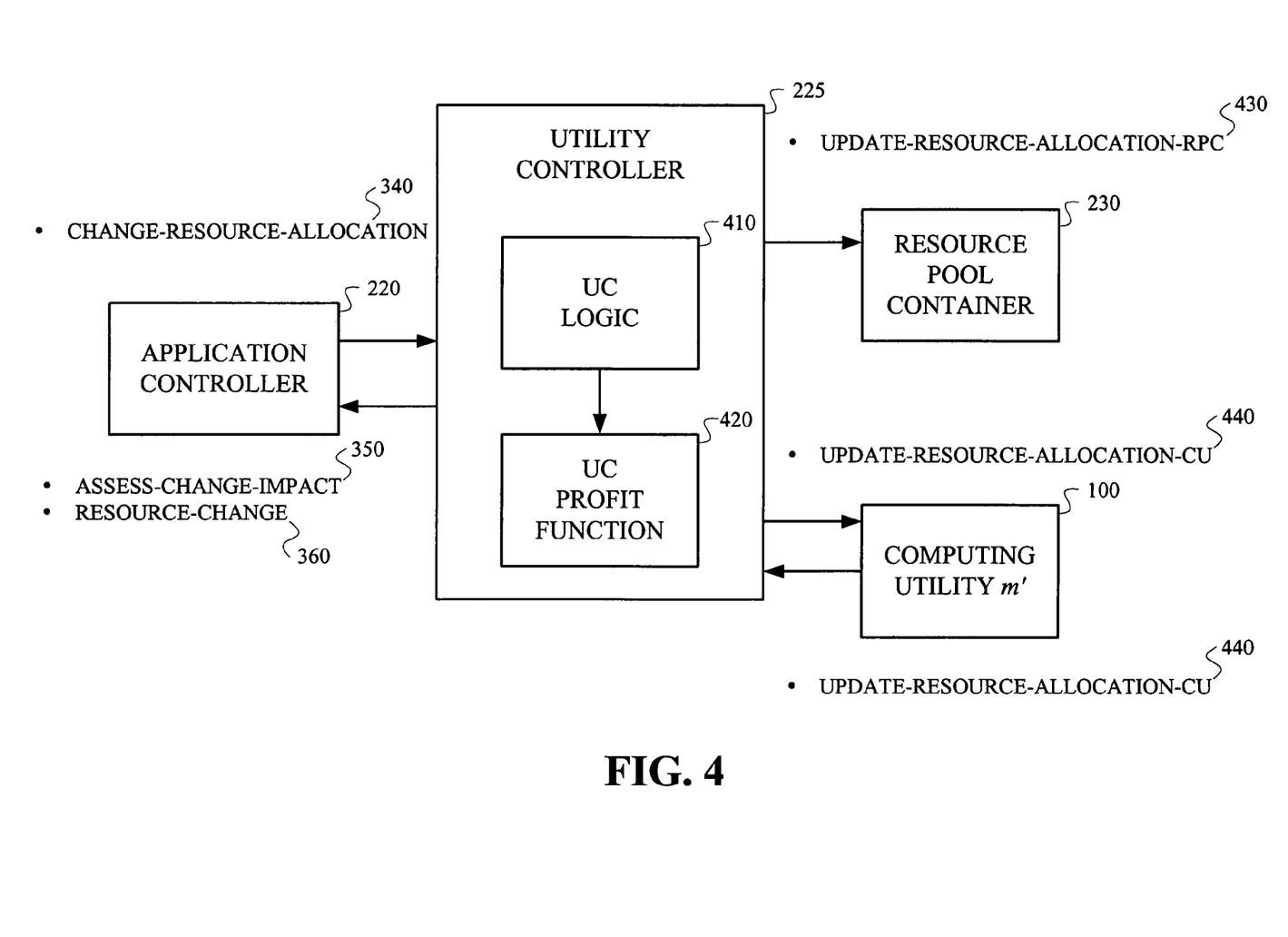
FIG. 4 illustrates a utility controller system, according to an embodiment of the invention.

FIG. 4 illustrates a Utility Controller system, according to an embodiment of the invention. Utility Controller 225 comprises a UC Logic system 410 and a UC Profit Function system 420. The Utility Controller 225 sends an update-resource-allocation-RPC message 430 to the Resource Pool Container (RPC) 230 when resources are allocated or released. The Utility Controller 225 sends to other Computing Utilities (CU) an update-resource-allocation-CU message 440 in response to requests received from other Computing Utilities. The Utility Controller receives update-resource-allocation-CU messages from other Computing Utilities.

Figure 5:
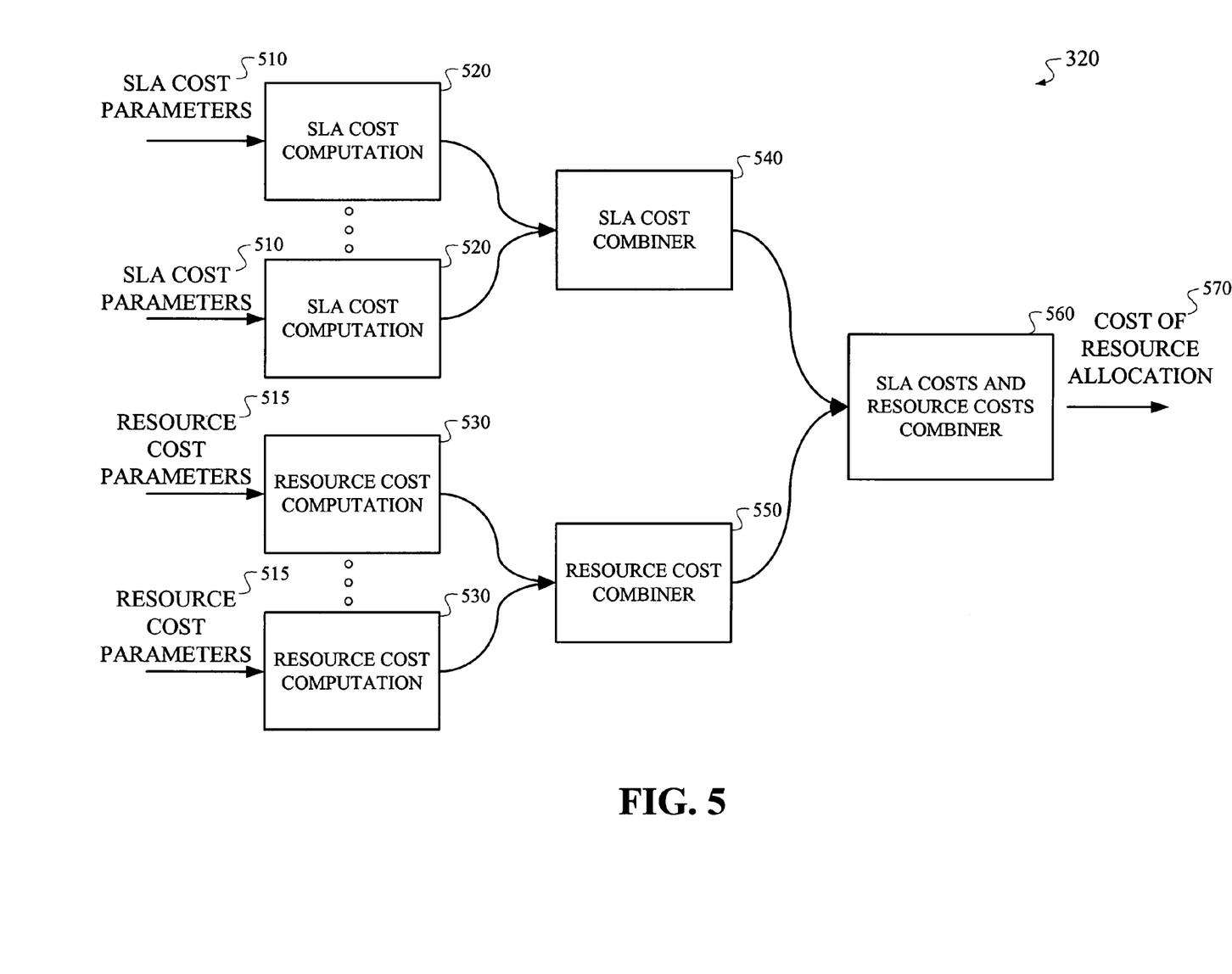
FIG. 5 illustrates an application controller cost function system, according to an embodiment of the invention.

FIG. 5 illustrates an Application Controller Cost Function system 320, according to an embodiment of the invention. This system comprises one or more SLA cost computing components 520 that compute SLA costs from the SLA specifications and the metrics in the service level objective (e.g., response times, throughputs) 510. These separate costs are combined by an SLA cost combiner 540. The resource cost computation system 530 computes the cost of resources from resource parameters 515 such as usage times, cost per minute, and resource types. The resource cost combiner 550 combines these costs. The SLA costs and resource costs combiner 560 aggregates the total SLA costs and total resource costs to produce the cost of resource allocation 570.

One embodiment of the resource cost computation is as follows. Let $h_i$ be the cost per time unit for an ASP that owns a resource of type i, and let $m_i$ be the number of instances of a type i resource. Then, a linear cost model is one for the resource cost is $h_i m_i T$, where T is the time for which the resources are held. The total cost for the ASP is the sum of $h_i m_i T$, for each type of resource. An example of a resource cost combiner would be a summation of these costs. Functions can be defined for SLA costs as well.

Figure 6:
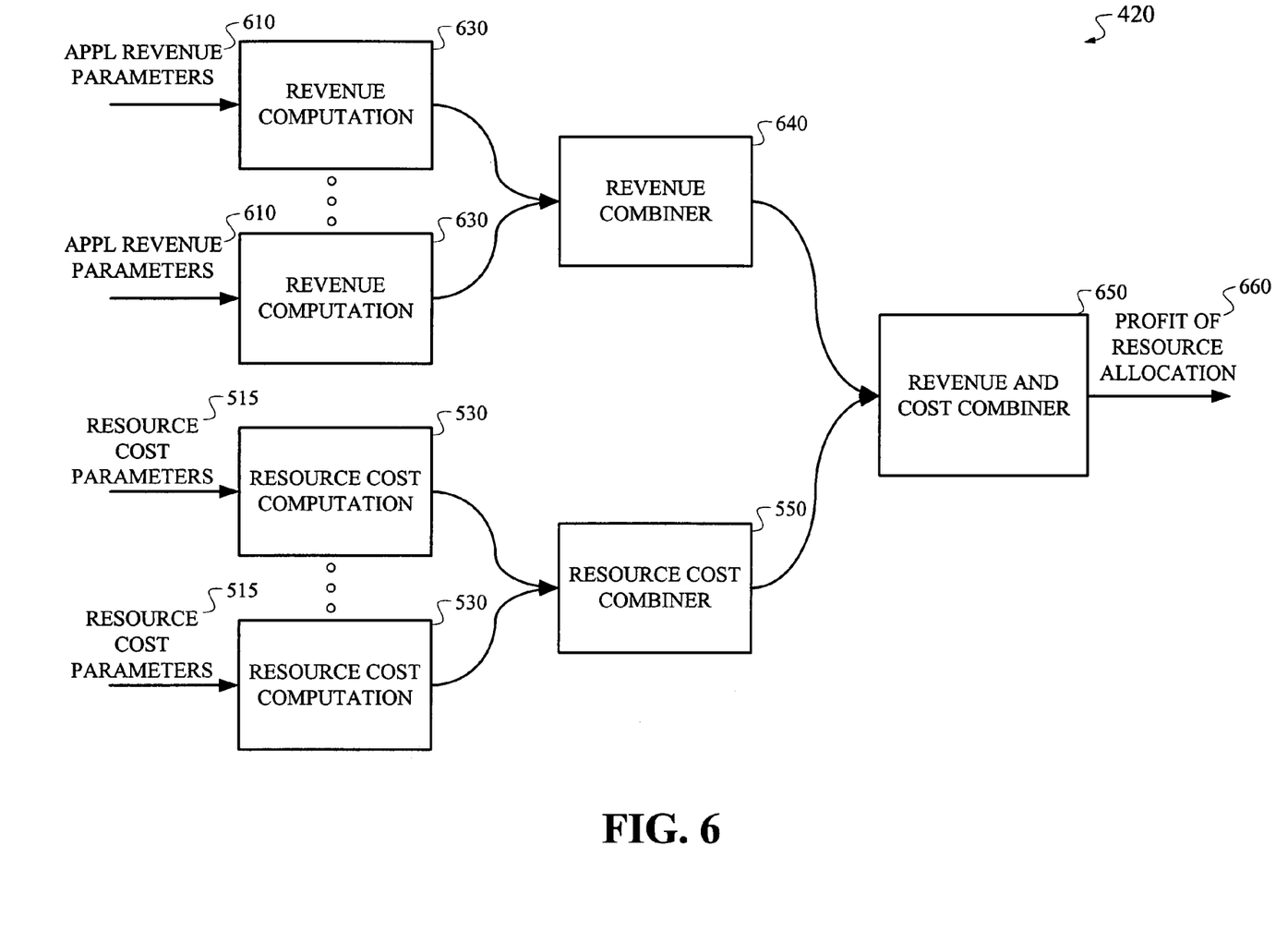
FIG. 6 illustrates a utility controller profit function system, according to an embodiment of the invention.

FIG. 6 illustrates a Utility Controller Profit Function system 420, according to an embodiment of the invention. This system comprises one or more resource cost computing components 530. It also has multiple revenue computation components 630 that compute the revenue obtained from ASPs using resources based on application revenue parameters 610 such as cost per minute for resources. The separate resource costs are combined by a resource cost combiner 550. The separate revenues are combined by a revenue combiner 640. The total costs and revenues are input to the revenue and cost combiner 650 that produces the profit for a resource allocation 660.

Figure 7:
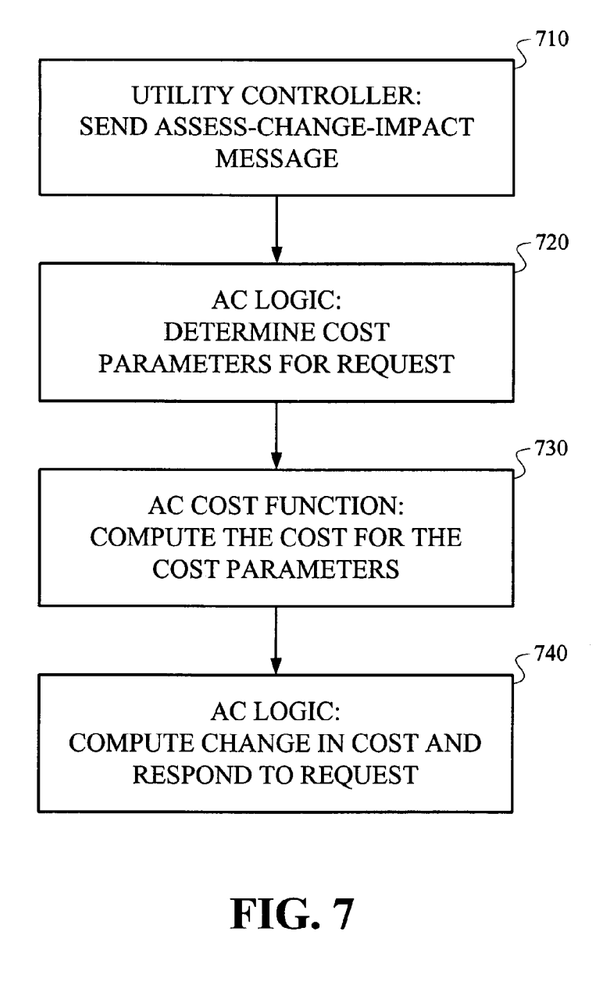
FIG. 7 illustrates a method used by an application controller to process an assess-change-impact message, according to an embodiment of the invention.

FIG. 7 illustrates a method used by the Application Controller to process an assess-change-impact message, according to an embodiment of the invention. In step 710, the Utility Controller sends the assess-change-impact message. In step 720, the AC Logic of the Application Controller determines the cost parameters to use in response to the assess-change-impact message. In step 730, the AC Cost Function computes costs based on the parameters provided. In step 740, the AC Logic computes the change in cost and responds to the request.

Figure 8:
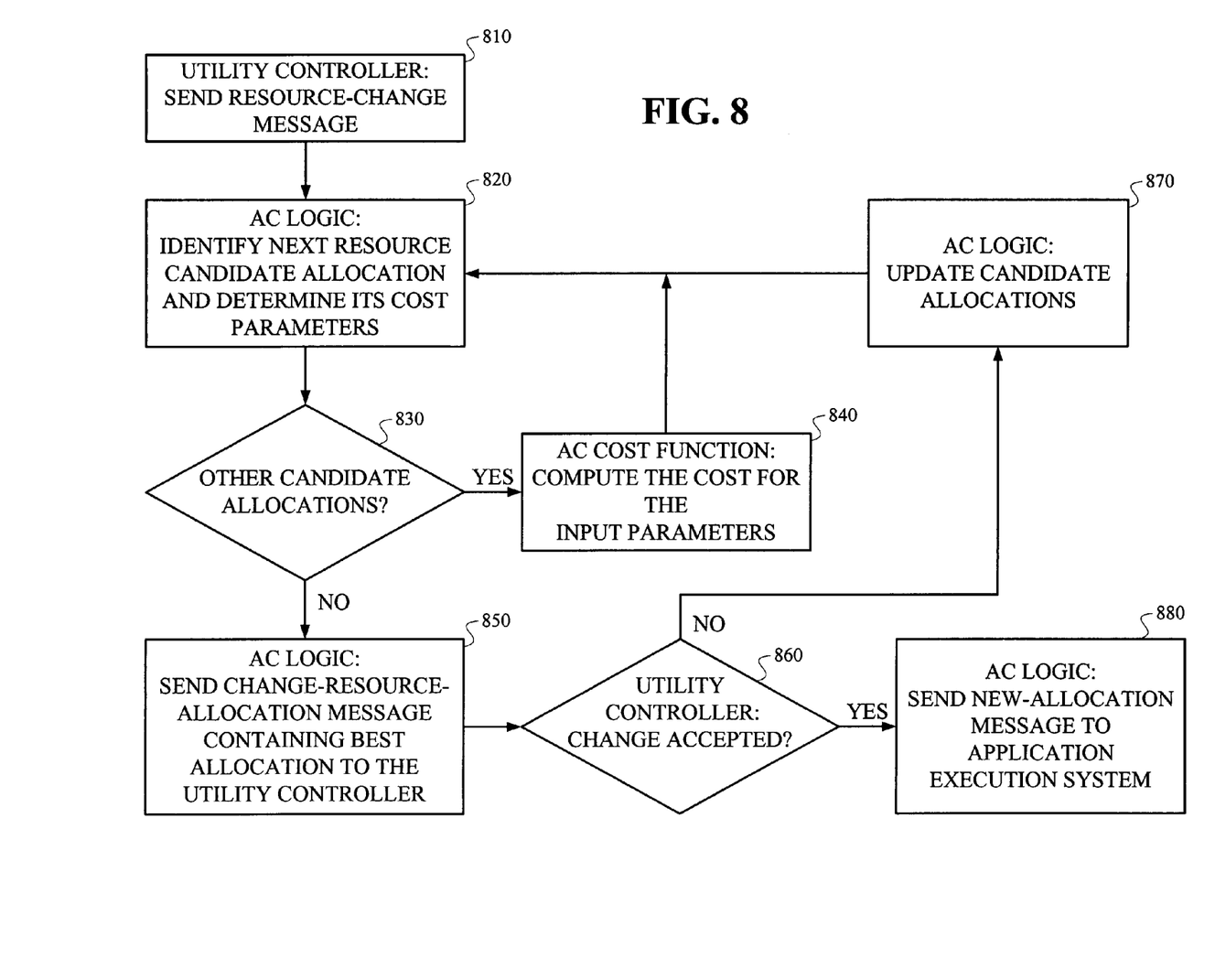
FIG. 8 illustrates a method used by an application controller in response to a resource-change message, according to an embodiment of the invention.

FIG. 8 illustrates a method used by the Application Controller in response to a resource-change message, according to an embodiment of the invention. In step 810, the Utility Controller sends the resource-change message. In step 820, the AC Logic of the Application Controller initializes and operates an iteration loop to search for possible resource allocations. In step 830, a check is made to see if all candidate resource allocations have been considered. In step 840, the AC Cost Function is invoked for a selected resource allocation. If all candidate resource allocations have been considered, then the AC Logic in step 850 sends a change-resource-allocation message containing the best allocation to the Utility Controller. If the Utility Controller accepts the change in step 860, then AC Logic sends a new-allocation message to the Application Execution System in step 880. If the change is not accepted, the AC Logic updates the feasible allocations in step 870 to reflect the constraints implied in the response from the Utility Controller and the iteration is begin anew in step 820.

Figure 9:
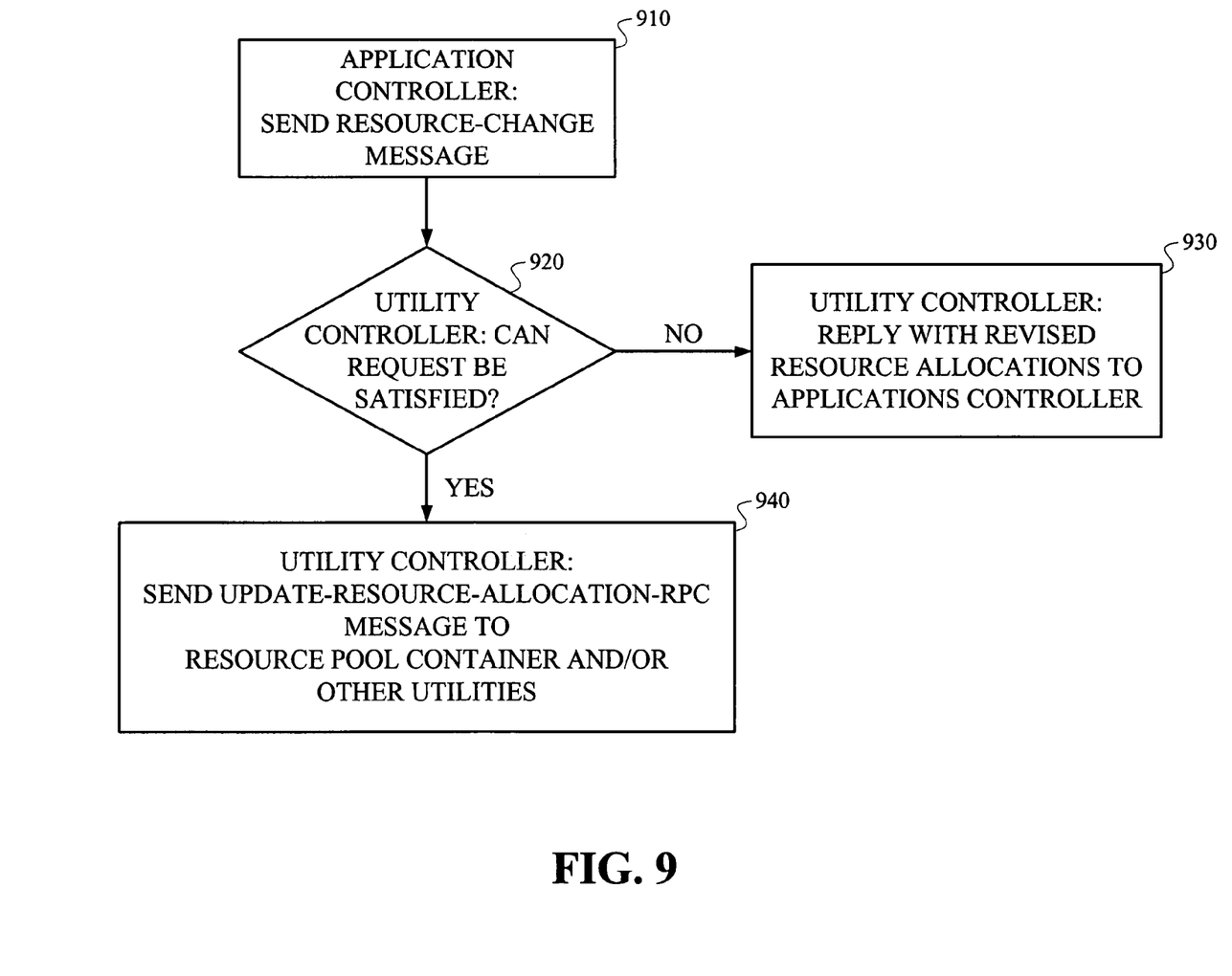
FIG. 9 illustrates a method used by a utility controller in response to a change-resource-allocation message, according to an embodiment of the invention.

FIG. 9 illustrates a method used by the Utility Controller in response to a change-resource-allocation message, according to an embodiment of the invention. In step 910, the Application Controller sends the resource-change-message to the Utility Controller. In step 920, the Utility Controller determines if the request can be satisfied. If not, then in step 930, the Utility Controller replies indicating what resource allocations can be satisfied. If it can be satisfied, then in step 940, the Utility controller sends an update-resource-allocation-RPC message to the Resource Pool Container and/or other computing utilities so that the change in resource allocations is effected.

Figure 10:
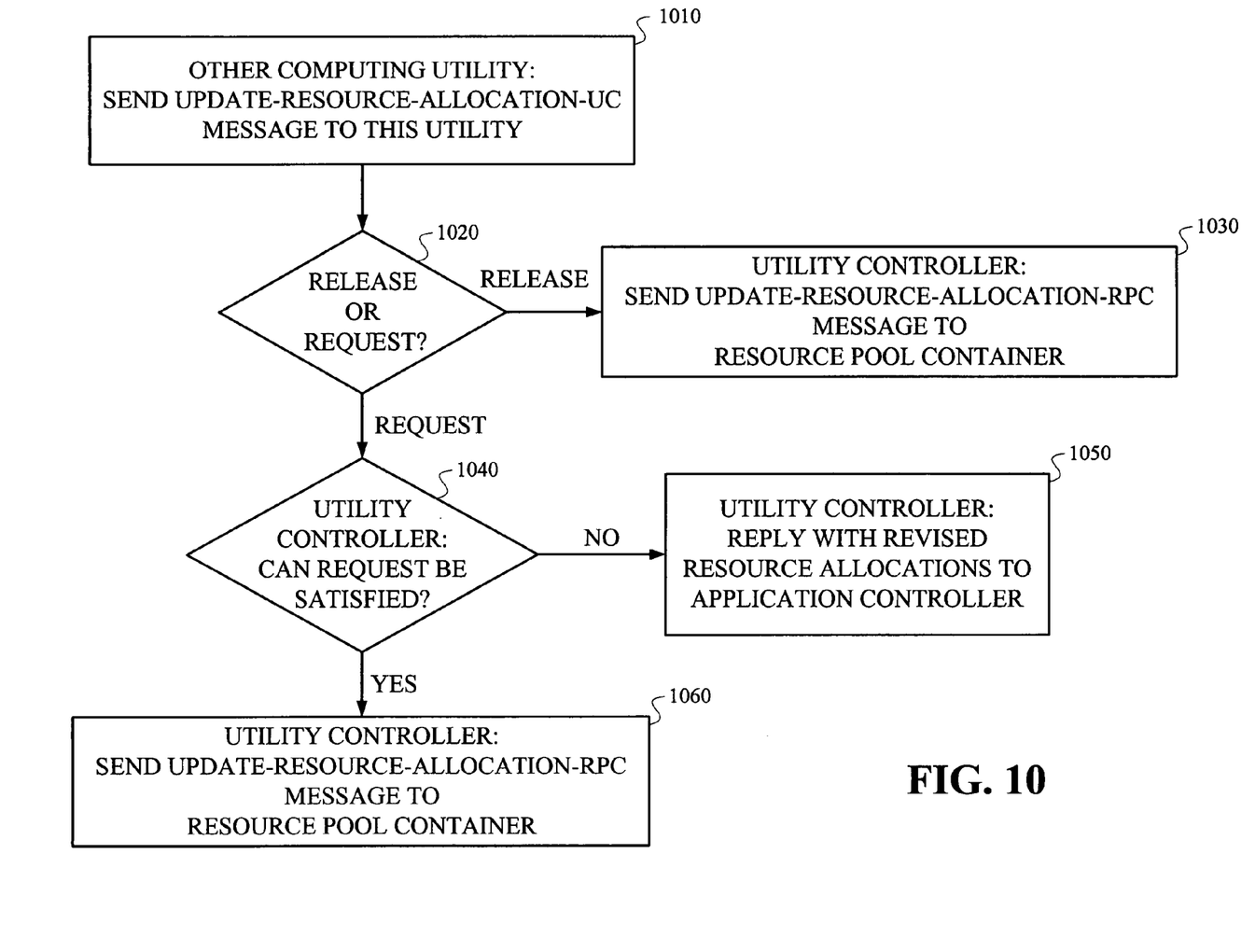
FIG. 10 illustrates a method used by a utility controller to respond to an update-resource-allocation message, according to an embodiment of the invention.

FIG. 10 illustrates a method used by the Utility Controller to respond to an update-resource-allocation message, according to an embodiment of the invention. In step 1010, an update-resource-allocation-UC message is received from another Computing Utility. In step 1020, the message is handled differently depending on whether it is a request for additional resource or a release of a resource already held. In step 1030, a release is processed by sending an update-resource-allocation-RPC message to the Resource Pool Container. In step 1040, a request is processed by the Utility Controller by determining if it can be satisfied. If it can, then in step 1060, update-resource-allocation-RPC message is sent to the Resource Pool Container. If the request cannot be satisfied, then in step 1050, the Utility Controller replies with an updated description of the candidate resources available.

Figure 11:
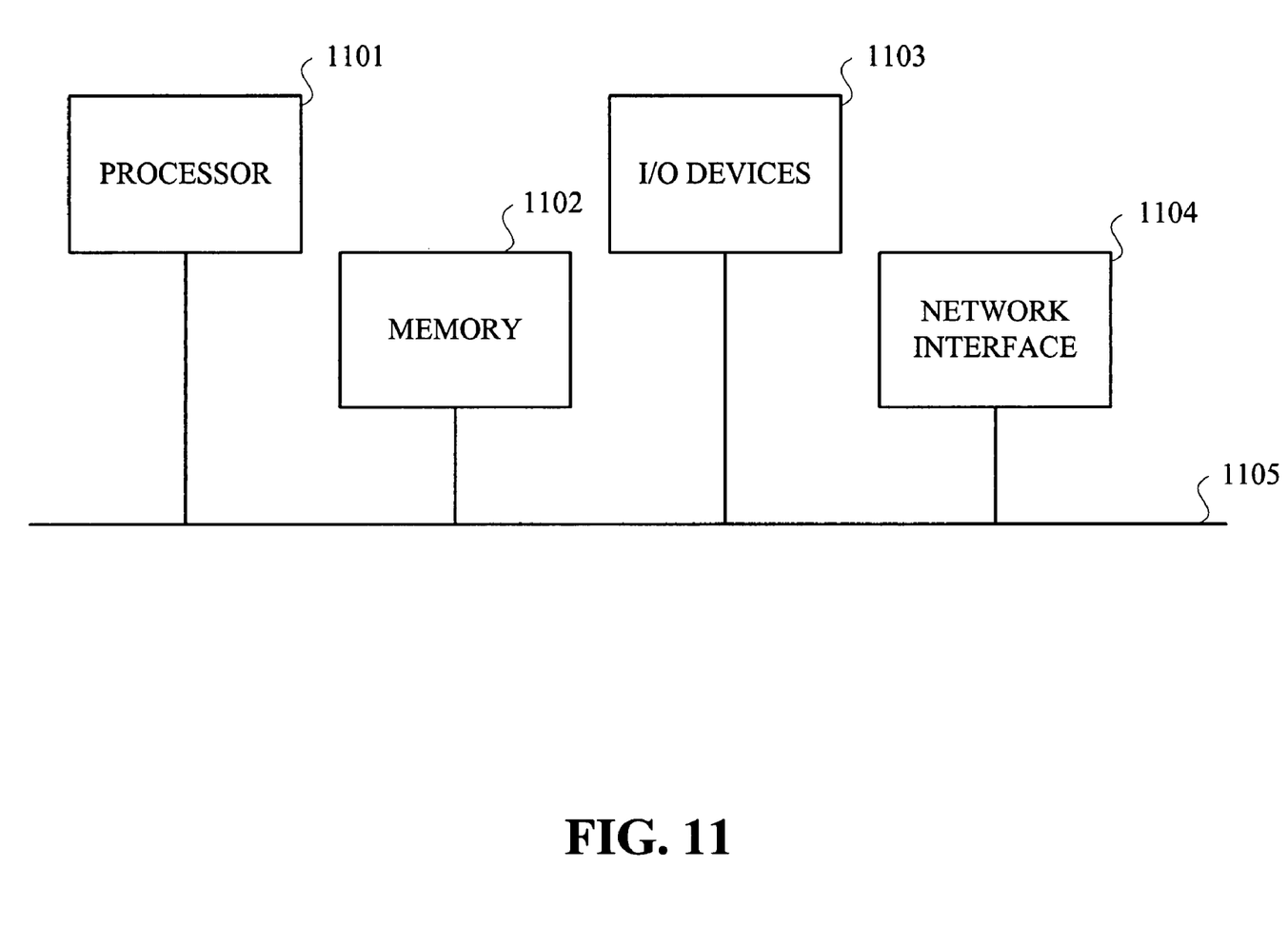
FIG. 11 illustrates an illustrative hardware implementation of a computing system in accordance with which one or more components/steps of a computing utility may be implemented, according to an embodiment of the invention.

FIG. 11 illustrates an illustrative hardware implementation of a computing system in accordance with which one or more components/steps of a computing utility (e.g., components and methodologies described in the context of FIGS. 1 through 10) may be implemented, according to an embodiment of the invention. It is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system may be implemented in accordance with a processor 1101, a memory 1102, I/O devices 1103, and a network interface 1104, coupled via a computer bus 1105 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also comprises techniques for providing computing utility services. By way of example, a computing utility infrastructure provider agrees (e.g., via a service level agreement or some informal agreement or arrangement) with a customer or client, such as an application service provider (ASP), to provide computing utility services. Then, based on terms of the service contract between the infrastructure provider and the customer, the infrastructure provider hosts the applications of the ASP in accordance with one or more of the optimization methodologies of the invention described herein.

Furthermore, while the foregoing describes some preferred embodiment, several extensions are apparent to one skilled in the art.

1. Messages may batch information so that a single message may invoke multiple methods (e.g., having multiple resource requests in an update-resource-allocation UC message).

2. While a preferred embodiment separates AC Control from AC Cost Function, this need not be the case. For example, if the AC Cost Function has a simple algebraic form, it is possible to use analytic techniques (e.g., differentiation) to find the optimal value of business metrics. In this case, no search is required.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in a computing utility, wherein the computing utility comprises a plurality of application service provider systems and a utility controller, and an application service provider system comprising an application controller, the method comprising the steps of:

obtaining a request of an application to one of the plurality of application service provider systems; and in response to the application: (i) an application controller of the application service provider system to which the application request is directed computing a value of a first metric associated with a resource action, wherein the application controller comprises an application controller metric function and application controller logic, wherein the application controller metric function computes the value of the first metric and the application controller logic searches a set of possible resource actions to determine an optimal resource action based on the first metric value computed by the application controller metric function; and (ii) the utility controller computing a value of a second metric associated with a resource action, wherein the utility controller comprises a utility controller metric function and utility controller logic, wherein the utility controller metric function computes the value of the second metric and the utility controller logic searches a set of possible resource actions to determine an optimal resource action based on the second metric value computed by the utility controller metric function;

wherein the resource action is at least one of a request, a release, an allocation, and a reclaiming of computing services;

computing by the application controller, a value of a first metric that comprises computing a total cost from an aggregate service level agreement cost and an aggregate resource cost;

computing by the utility controller, a value of a second metric that comprises computing an aggregated resource cost from different resources;

notifying the application controller that previously allocated resources must be returned; and notifying the utility controller that resources are returned.

2. The method of claim 1, wherein the step of the application controller computing a value of a first metric further comprises computing a service level agreement cost from one or more service level agreement parameters.

3. The method of claim 1, wherein the step of the application controller computing a value of a first metric further comprises computing a resource cost from one or more resource parameters.

4. The method of claim 1, wherein the step of the application controller computing a value of a first metric further comprises computing an aggregate service level agreement cost from different service level agreements.

5. The method of claim 1, wherein the step of the application controller computing a value of a first metric further comprises computing an aggregate resource cost from different resources.

6. The method of claim 1, wherein the step of the utility controller computing a value of a second metric further comprises computing a resource cost from one or more resource parameters.

7. The method of claim 1, wherein the step of the utility controller computing a value of a second metric further comprises computing an application service provider revenue.

8. The method of claim 1, wherein the step of the utility controller computing a value of a second metric further comprises computing an aggregated revenue from individual application service provider revenues.

9. The method of claim 1, wherein the step of the utility controller computing a value of a second metric further comprises computing a profit from aggregated application service provider revenues and aggregated resource costs.

10. The method of claim 1, further comprising the step of the application controller requesting a number of resources of a specific type from the utility controller.

11. The method of claim 1, further comprising the step of the utility controller notifying the application controller that new resources are available.

12. A method for providing a computing utility service, comprising:

a computing utility provider providing a service associated with a computing utility to a customer, wherein the computing utility comprises a plurality of application service provider systems and a utility controller, and an application service provider system comprising an application controller, the service comprising:

obtaining a request of an application to one of the plurality of application service provider systems; and in response to the application: (i) the application controller of the application service provider system to which the application request is directed computing a value of a first metric associated with a resource action, wherein the application controller comprises an application controller metric function and application controller logic, wherein the application controller metric function computes the value of the first metric and the application controller logic searches a set of possible resource actions to determine an optimal resource action based on the first metric value computed by the application controller metric function; and (ii) the utility controller computing a value of a second metric associated with a resource action, wherein the utility controller comprises a utility controller metric function and a utility controller logic, wherein the utility controller metric function computes the value of the second metric and the utility controller logic searches a set of possible resource actions to determine an optimal resource action based on the second metric value computed by the utility controller metric function;

wherein the resource action is at least one of a request, a release, an allocation, and a reclaiming of computing services;

computing by the application controller, a value of a first metric that comprises computing a total cost from an aggregate service level agreement cost and an aggregate resource cost;

computing by the utility controller, a value of a second metric that comprises computing an aggregated resource cost from different resources;

notifying the application controller that previously allocated resources must be returned; and notifying the utility controller that resources are returned.

* * * * *